United States Patent
Wong

(10) Patent No.: US 8,205,816 B2
(45) Date of Patent: Jun. 26, 2012

(54) SINGLE-HANDED VERTICAL SOLID MATERIAL GRINDER

(76) Inventor: Yan Kwong Wong, Kowloon (HK)

(*) Notice: Subject to any disclaimer, the term of this patent is extended or adjusted under 35 U.S.C. 154(b) by 78 days.

(21) Appl. No.: 12/679,308

(22) PCT Filed: May 25, 2009

(86) PCT No.: PCT/CN2009/071943
§ 371 (c)(1),
(2), (4) Date: Mar. 20, 2010

(87) PCT Pub. No.: WO2010/000162
PCT Pub. Date: Jan. 7, 2010

(65) Prior Publication Data
US 2010/0219277 A1    Sep. 2, 2010

(30) Foreign Application Priority Data
Jul. 4, 2008 (CN) .......................... 2008 1 0068404

(51) Int. Cl.
*A47J 17/00* (2006.01)
*A47J 43/00* (2006.01)
(52) U.S. Cl. ........................ 241/168; 241/169; 241/169.1
(58) Field of Classification Search .................. 241/168, 241/169, 169.1
See application file for complete search history.

(56) References Cited

U.S. PATENT DOCUMENTS

| | | | | |
|---|---|---|---|---|
| 5,988,543 A * | 11/1999 | Wu | ............................... | 241/168 |
| 6,568,616 B1 * | 5/2003 | Tang | ............................... | 241/168 |
| 6,926,214 B2 * | 8/2005 | Holcomb et al. | ............ | 241/169 |
| 2003/0192971 A1 * | 10/2003 | Holcomb et al. | ............... | 241/30 |
| 2004/0159726 A1 * | 8/2004 | Holcomb et al. | ............ | 241/169 |
| 2005/0023389 A1 * | 2/2005 | Wu | ............................ | 241/169.1 |
| 2005/0133644 A1 * | 6/2005 | Wu | ................................ | 241/169 |
| 2005/0133646 A1 * | 6/2005 | Holcomb et al. | ............ | 241/169 |
| 2006/0049292 A1 * | 3/2006 | Holcomb et al. | ............ | 241/169 |
| 2009/0200410 A1 * | 8/2009 | Griffith et al. | ............... | 241/169 |
| 2009/0236453 A1 * | 9/2009 | Heng et al. | .................... | 241/168 |
| 2010/0314477 A1 * | 12/2010 | Fong | .......................... | 241/169.1 |

* cited by examiner

*Primary Examiner* — Bena Miller
(74) *Attorney, Agent, or Firm* — Law Office of Sergei Orel, LLC

(57) ABSTRACT

This utility patent is a single-handed vertical solid material grinder. It includes a shell, a handle set with a motion handle and a mounted handle, and a grinding set. The grinding set has a sector unit that is a sector cylinder with parallel teeth and a grinding unit with fixed teeth. The mounted handle is placed inside the shell. Between the motion handle and the shell is an elastic repositioning unit. There is a driving set between the motion handle and the sector unit. When using one hand to pull and then release the handle set, through the handle set inside the shell and the grinding set of sector unit and grinding unit, the motion handle will drive the sector unit move back and forth around the spinning axis, thus pushing the parallel teeth on the sector surface to smash back and forth through the fixed teeth on the grinding unit's surface. Thus the solid raw material is caught between the surfaces of the parallel teeth and the fixed teeth and is grinded down. So by using one hand to operate the handle set the user can continuously grind the material particles. It can reduce a lot of effort. And by setting a collection box on the outlet of the shell, the grinded particles can be collected without wasted.

12 Claims, 11 Drawing Sheets

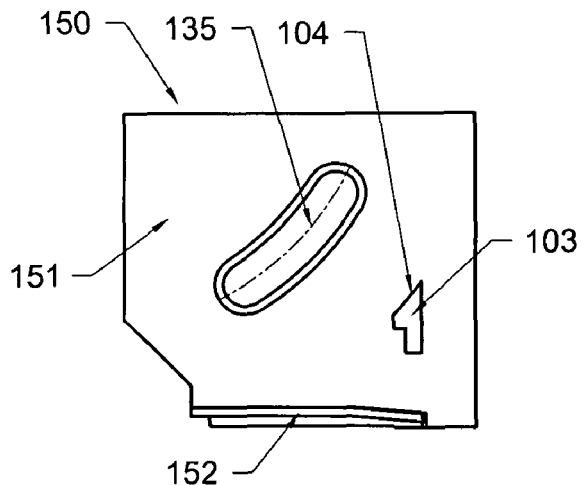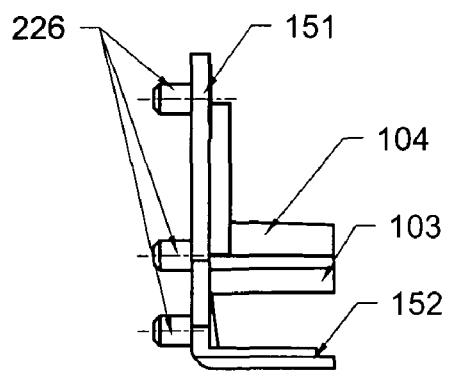
Fig.11          Fig.12
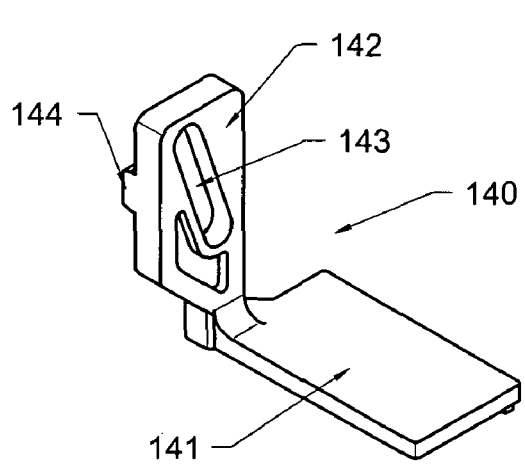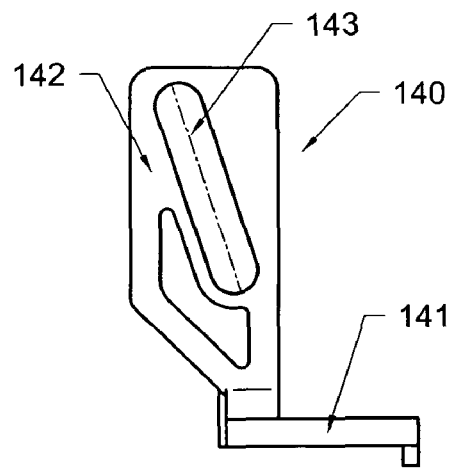
Fig.13          Fig.14

SINGLE-HANDED VERTICAL SOLID MATERIAL GRINDER

This application is a U.S. national stage of PCT application PCT/CN2009/071943, filed on 25 May 2009, which claims priority of Chinese application No. 200820095322.9, filed 4 Jul. 2008

BACKGROUND OF THE INVENTION

1. Field of the Invention

This utility patent application is a kitchen appliance. To be exact, it is a single-handed vertical solid material grinder.

2. Description of Prior Art

A traditional grinder must be operated using both hands, such as the Chinese utility patent ZL01207465.9. In the patent published on Dec. 19, 2001, this grinder includes an upper binding unit and a lower binding unit. Each binding unit has a tooth ring with screw threads. The user need to use both hands to rotate both upper and lower binding units. The particles are grinded between the teeth of the two tooth rings. It is not convenient to use both hands to operate one machine in a busy kitchen environment.

SUMMARY OF THE INVENTION

The technical issue that this utility patent application aims to solve is: to overcome the current grinder's inconvenience of requiring two hands to operate, to provide a vertical solid material grinder that only requires one hand to use, thus to reduce the effort of operation.

The technical solution to the technical issue of this utility patent application is: to provide a single-handed vertical solid material grinder, which includes: a shell that has a material inlet and an outlet, which has a material chamber that contains the solid material particles and is connected to the inlet, a handle set with a motion handle and a mounted handle. The upper part of the motion handle and the mounted handle stretches outside the shell. The lower part of the mounted handle is mounted inside the shell. The lower part of the motion handle has a driving axis that is mounted inside the shell. The said motion handle can move back and forth around the said driving axis. Between the said motion handle and the shell there is an elastic repositioning unit that pushes the motion handle away from the mounted handle. a grinding set that includes a sector unit with a sector surface inside the shell and a grinding unit that is placed outside the sector surface. There are multiple parallel teeth on the said sector surface. There is a spinning axis mounted inside the shell at the sector unit's spinning center, and is vertical to the plane of the motion handle and the mounted handle. There is at least on fixed teeth on the said grinding unit that matches the said parallel teeth. Between the motion handle and the sector unit is a driving set that will driving the sector unit move back and forth around the spinning axis. There is an aperture leading from the material chamber to the fixed teeth of the grinding unit above the grinding unit in the said shell. There is an outlet beneath the fixed teeth on the grinding unit in the shell.

In the single-handed vertical solid material grinder of this utility patent application, the said driving set includes shaft and slot set between the said sector unit and the lower part of the motion handle.

In the single-handed vertical solid material grinder of this utility patent application, the said sector unit's spinning axis and the motion handle's driving axis overlap each other. The said sector unit fits into the motion handle via the driving set.

In the single-handed vertical solid material grinder of this utility patent application, there is a horizontal slot at the outlet in the shell. The slot has a slotting cover that can cover the outlet. The said slotting cover has a vertical trail. There is a driving shaft in the said sector unit that matches the said vertical trail. The said driving shaft drives the said slotting cover to move back and forth in the slot.

In the single-handed vertical solid material grinder of this utility patent application, there is a notch on the inner surface of the shell. There is a notch cover on the notch. Between the notch cover and the notch is a slot. There is a sector slot in the said notch cover that has the same rotation axis as the sector unit. The said driving shaft passes through the said sector slot and matches into the vertical slot of the slotting cover.

In the single-handed vertical solid material grinder of this utility patent application, there is a particle removing column inside the shell under the said sector unit. The particle removing column has a particle removing surface that faces the sector surface and has the same center as the sector surface. The said particle removing surface is right outside the sector surface.

In the single-handed vertical solid material grinder of this utility patent application, the said elastic repositioning unit is a spring between the sector surface and the shell.

In the single-handed vertical solid material grinder of this utility patent application, the said grinding unit is placed in the grinding unit chamber inside the shell and facing the sector surface. There is a distance adjustment screw on the grinding unit in the shell to adjust the distance between the fixed teeth and the parallel teeth.

In the single-handed vertical solid material grinder of this utility patent application, the said shell has an outer shell and an inner shell. The said material chamber is between the outer shell and the inner shell. Both the said inlet and outlet are on the said outer shell. The said aperture connecting the material chamber and the grinding unit is in the inner shell. The said handle set and the grinding set are inside the inner shell.

In the single-handed vertical solid material grinder of this utility patent application, there is a sealing cover on the inlet. The said sealing cover has a mounting axis on one end, which is mounted to the outer shell. To the other end is a stretching rim that covers the inlet.

In the single-handed vertical solid material grinder of this utility patent application, there is a teeth unit on the sector surface of the sector unit. The said parallel teeth are all located on the outside of the teeth unit.

In the single-handed vertical solid material grinder of this utility patent application, there is a collection box under the outlet on the outer shell to collect the particles generated.

In the single-handed vertical solid material grinder of this utility patent application, there is a sliding proof cover on the motion handle of the handle set.

The single-handed vertical solid material grinder of this utility patent application has these benefits: The handle set with the motion handle and the mounted handle and the grinding unit with the sector unit with a sector surface and a grinding unit are both placed inside the shell. Both the sector unit and the grinding unit are in the shell. The sector unit can spin along the spinning axis inside the shell. And the motion handle can spin along the driving axis inside the shell. There are multiple teeth on the sector surface. The grinding unit is mounted in the shell and has at least one fixed teeth that matches into the sector surface's teeth. By holding the handles with one hand, the user can drive the motion handle to spin along the driving axis. The motion handle will then drive the sector unit to spin along the spinning axis via the driving set. So the teeth on the sector surface of the sector unit will move back and forth. By adjusting the distance between the sector unit and the grinding unit to appropriate size, the teeth on the sector surface will sweep over the fixed teeth of the grinding unit, bring the particles that falls into the fixed teeth from the material chamber through the aperture to move with the teeth, smash the particles with the teeth on the sector unit and the fixed teeth on the grinding unit, and achieve the grinding effect. At the same time, since there is an elastic repositioning unit between the motion handle and the shell, when the user looses the hand on the handle set, the motion handle will be pushed away from the mounted handle by the elastic repositioning unit, thus pushing the teeth on the sector surface back. The grinding unit is then move back to initial position. Thus, by using only one hand to operate on the handle set, the teeth on the sector surface of the grinding set will move back and forth along the spinning axis. The teeth on the sector unit keep on smashing the particles with the fixed teeth on the grinding unit to smaller ones. The user can continuously keep on grinding by using only one hand. The other hand can take care of other business. It is much more convenient.

Furthermore, a slot is set at the outlet in the shell. There is a slot cover that covers the outlet. There is a vertical trail on the said slot cover. On the side of the said sector surface there is a driving shaft that matches into the said vertical trail. The said driving shaft will drive the said slot cover to move back and forth inside the slot. When the motion handle drives the teeth unit on the sector surface to spin, the driving shaft on the side of the sector surface will drive the slot cover to move along the slot, thus open the outlet so that the finished particles can slide out through the outlet. When the motion handle moves back, the driving shaft will driving the slot cover slide back to cover the outlet to prevent outside dust or other dirt from entering the shell when the grinder is not in use. Further, there is a collection box under the outlet at the bottom of the outer shell for colleting the finished particles. The finished particles will be collected into the collection box. After all the particles are grinded, the collection box can be taken out and the particles inside can be retrieved, thus preventing the finished particles from leaking and splashing around during the grinding process.

Furthermore, there is a particle removing column in the shell under the sector surface. The particle removing column has a particle removing surface that faces the sector surface and has the same center as the sector surface. The said particle removing surface is very close to the outside of the sector surface so that the sector surface and the particle removing surface are parallel to each other and have a very small distance. When the finished particles coming out of the grinding set is attached to the teeth unit, the particle removing column can strip them from the sector unit.

Further illustration of this utility patent application will be provided below using figures of an implementation example.

BRIEF DESCRIPTION OF THE FIGURES

FIG. 11 is the structural view of the notch cover of this single-handed vertical solid material grinder.

FIG. 12 is the left view of FIG. 11.

FIG. 13 is the structural view of the slot cover of this single-handed vertical solid material grinder.

FIG. 14 is the plain view of FIG. 13.

BACKGROUND OF THE INVENTION

Figure 1:
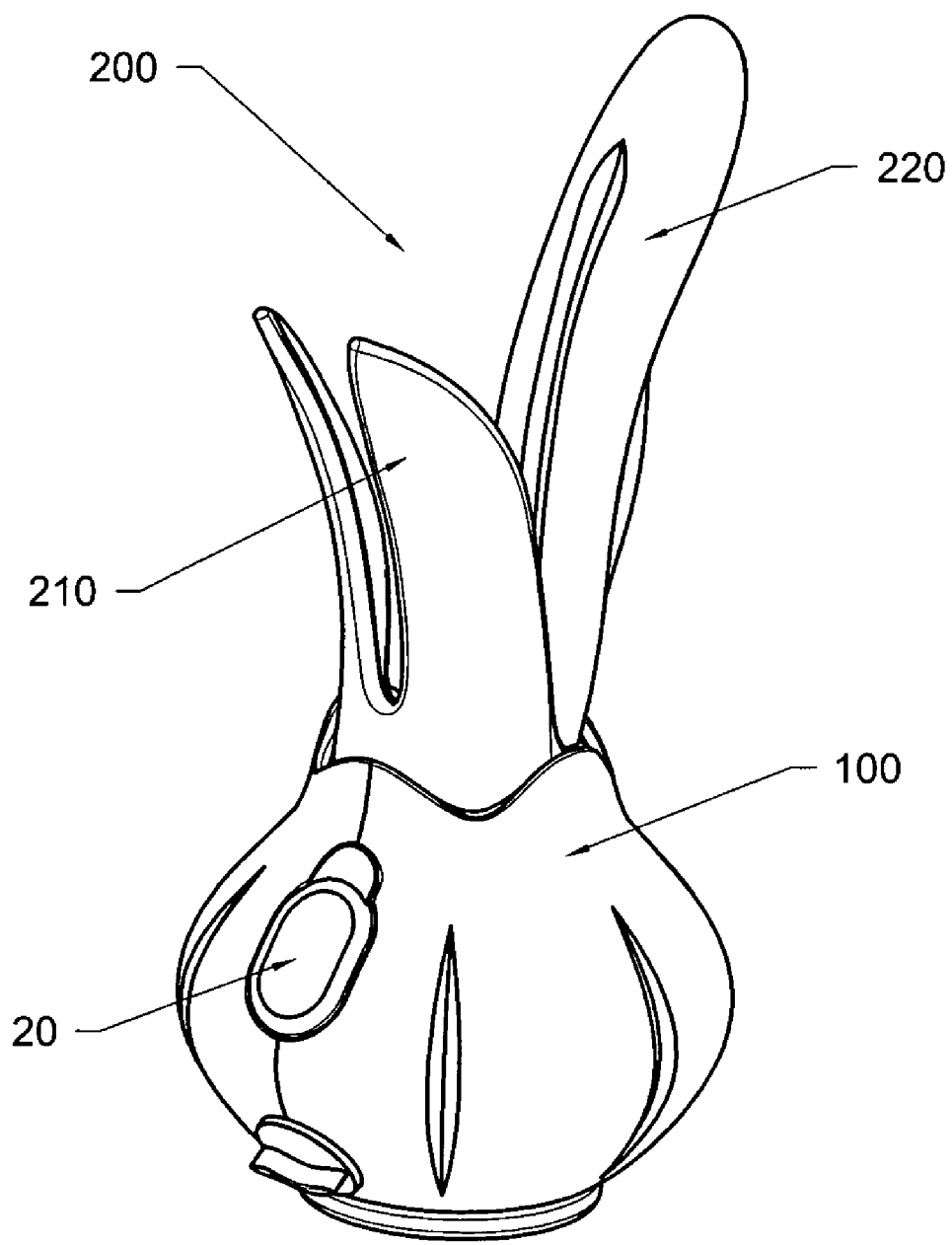
FIG. 1 is the full exterior view of this single-handed vertical solid material grinder.
Figure 2:
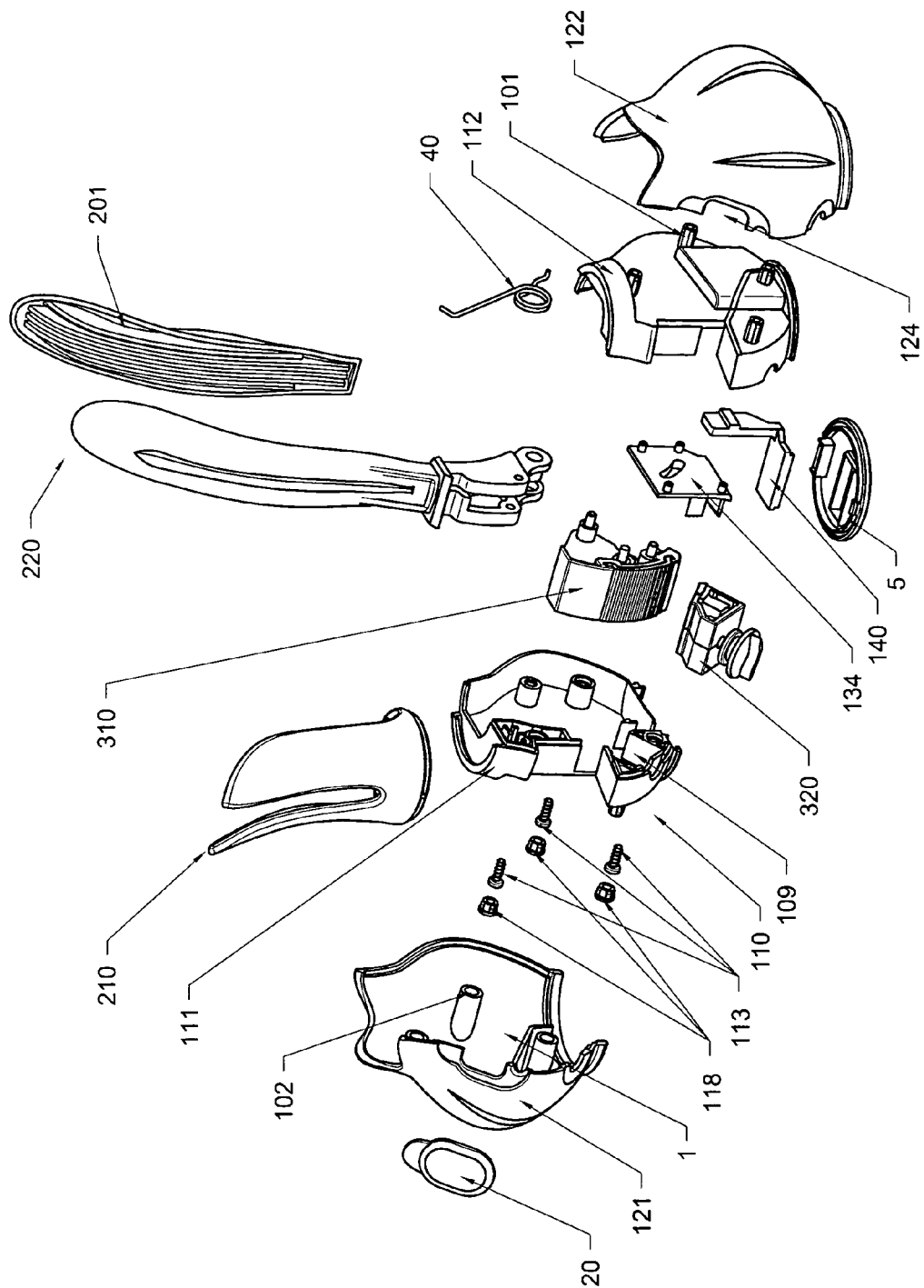
FIG. 2 is the dissembled view of this single-handed vertical solid material grinder.
Figure 7:
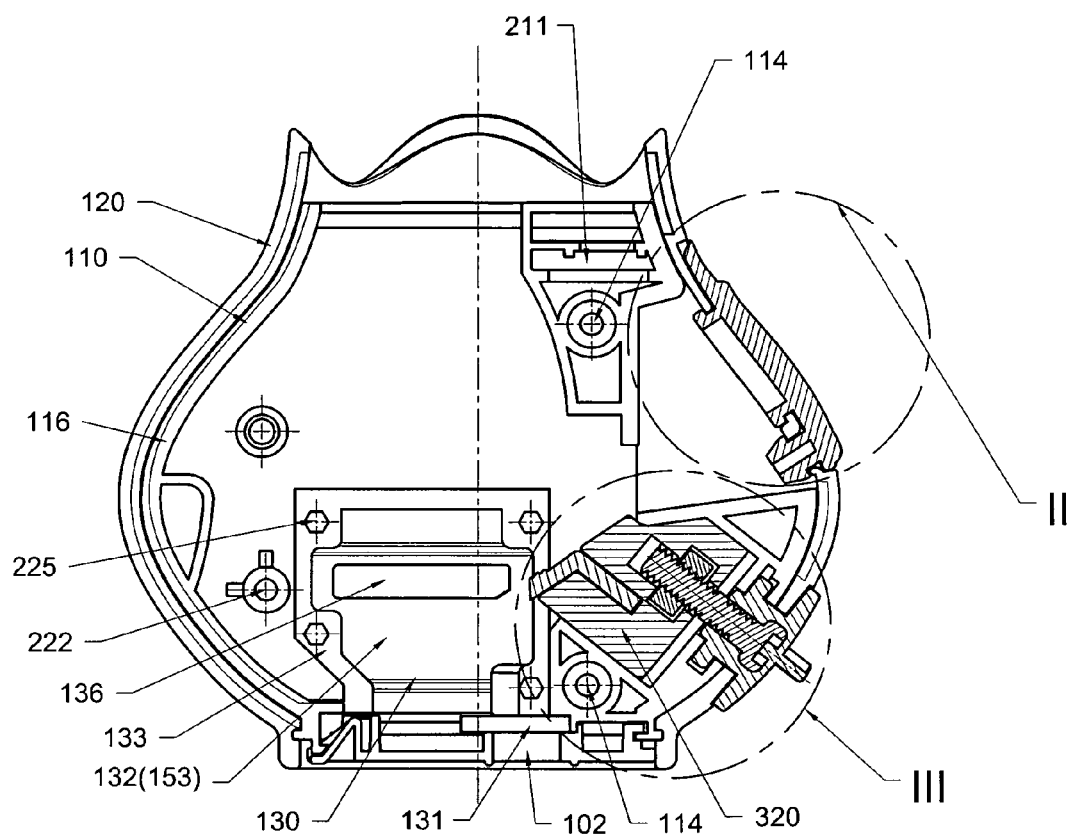
FIG. 7 is the structural view of FIG. 3 after removing the handle set.

As shown in FIG. 1 and FIG. 2, this implementation of this single-handed vertical solid material grinder of this utility patent application includes shell 100, handle set 200, and grinding set (not shown in FIG. 1). Shell 100 consists of inner shell 110 and outer shell 120. Between inner shell 110 and outer shell 120 is material chamber 1, which is used for holding solid particles. It is recommended that the outer shell 120 be made of transparent or semi-transparent material so that it is easier to see the amount of solid particles inside the chamber and to add more particles into the chamber 1 as needed. As shown in FIG. 2, both inner shell 100 and outer shell 120 have two sides: left and right, consisting left inner shell 111, right inner shell 112, left outer shell 121, and right outer shell 122. Between left inner shell 111 and right inner shell 112 are three positioning screw bolts 113 and screw holes 114 (as shown in FIG. 7). Left inner shell 111 and right inner shell 112 are fixed together by putting positioning screw bolts 113 into the screw holes 114, forming a chamber inside inner shell 110 to place handle set and grinding set. To prevent material particles from falling into screw holes and hampering the installation of screw bolts, Plugs 118 may be applied to each screw hole to seal the holes.

Figure 3:
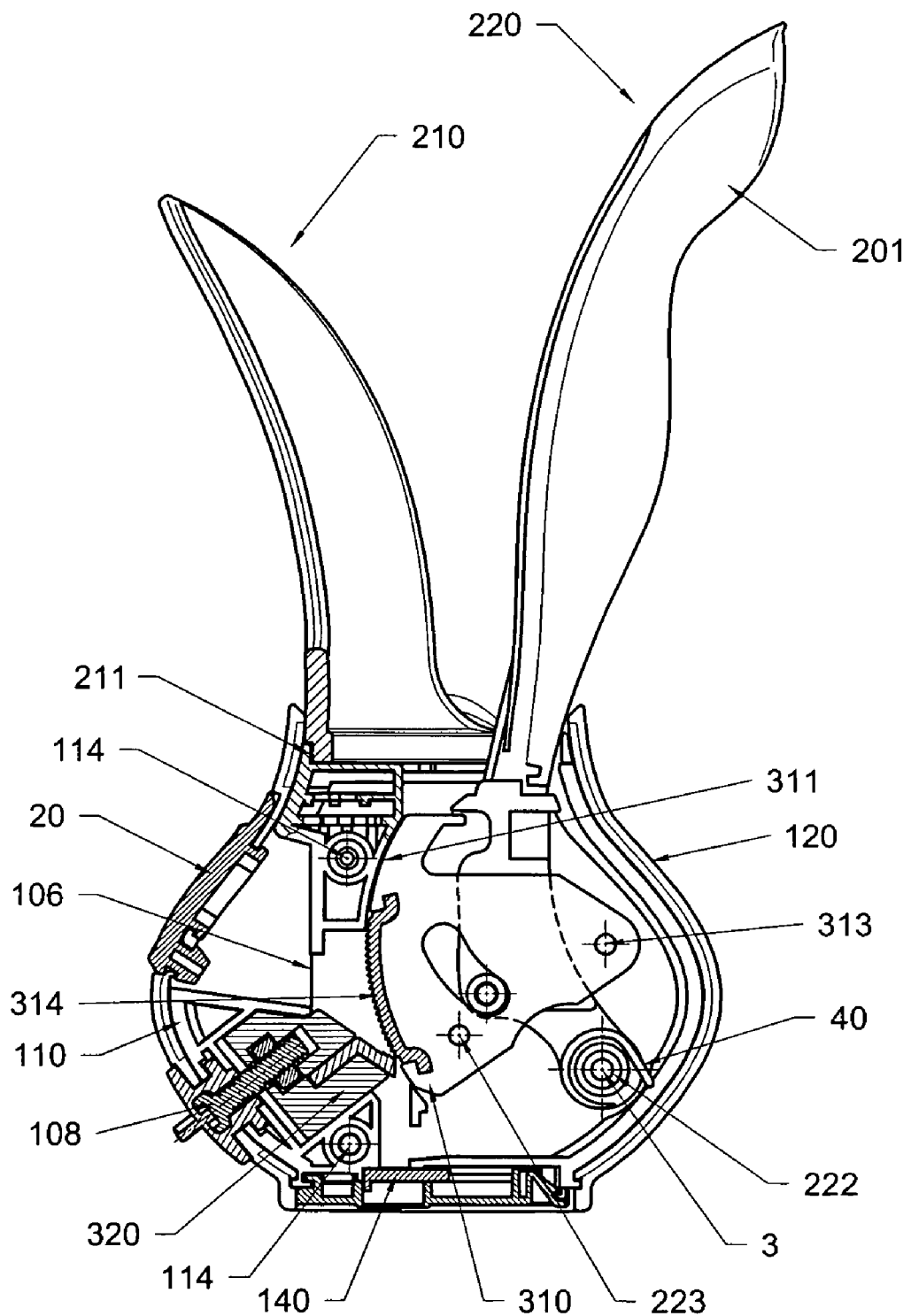
FIG. 3 is the sectional view of this single-handed vertical solid material grinder.
Figure 4:
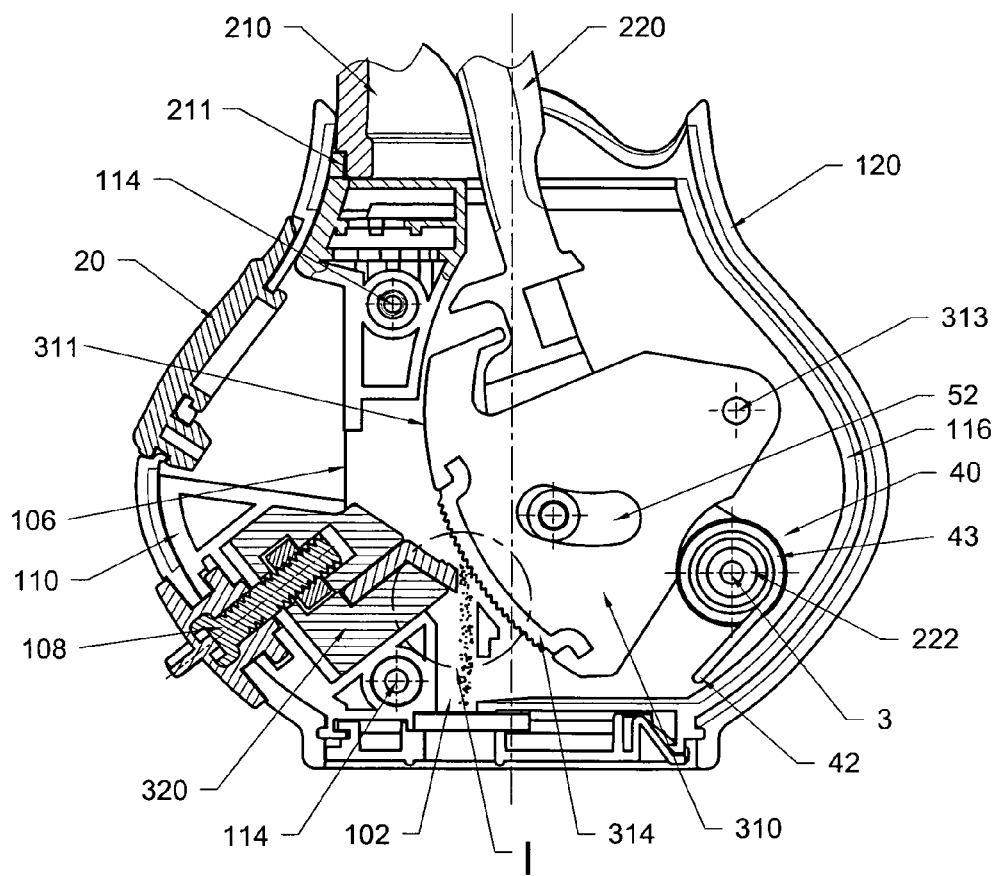
FIG. 4 is the structural view when the motion handle is held tight.

As shown in FIGS. 2 to 4, there are matching outer rim 115 (see FIG. 14) and inner rim 116 (see FIG. 7) at where left inner shell 111 and right inner shell 112 contact. Outer rim 115 matches inner rim 116 together to seal the right and left inner shells to prevent the particles from leaking out. Similarly, matching outer rim and inner rim can also be applied to left outer shell 121 and right outer shell 122 where they contact so that left outer shell 121 and right outer shell 122 are sealed to prevent outside dirt from entering the shell. There are positioning columns 101 and positioning holes 102 between the inner shell and the outer shell, to help fitting them together. As shown in FIG. 2, on the outer shell 120, there is inlet 124 matching where the material chamber 1 is, for feeding the material particles into the material chamber. There is also a removable cover 20 on the inlet 120, which will easily cover inlet 124 after the particles are fed into the chamber to prevent outside dirt from entering the shell.

Figure 5:
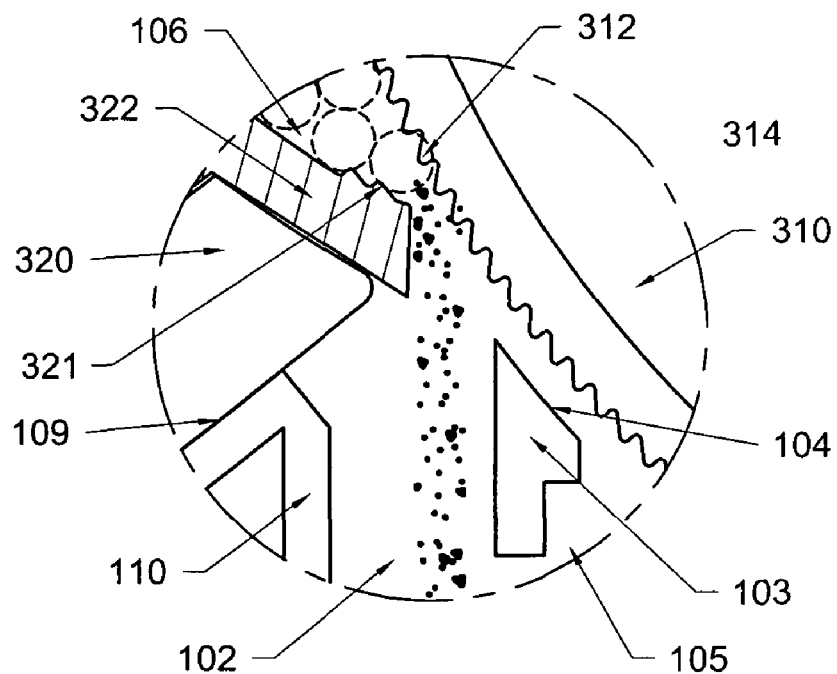
FIG. 5 is the detailed view of part I in FIG. 4

FIG. 5 is the detailed view of part I in FIG. 4.

Figures 6A, 6B, 6C:
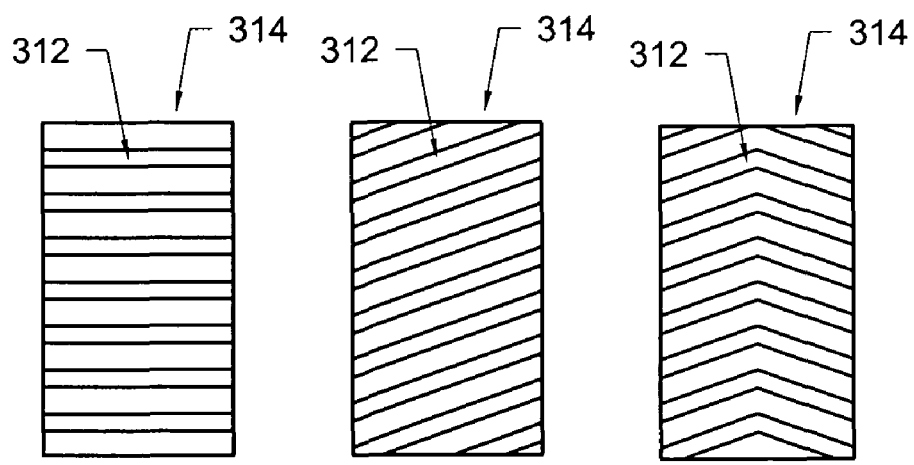
FIG. 6*a* is the first tooth pattern of the teeth unit of the single-handed vertical solid material grinder.
FIG. 6*b* is the second tooth pattern of the teeth unit of the single-handed vertical solid material grinder.
FIG. 6*c* is the third tooth pattern of the teeth unit of the single-handed vertical solid material grinder.

FIG. 6a is the first tooth pattern of the teeth unit of the single-handed vertical solid material grinder.

FIG. 6b is the second tooth pattern of the teeth unit of the single-handed vertical solid material grinder.

FIG. 6c is the third tooth pattern of the teeth unit of the single-handed vertical solid material grinder.

Figure 8:
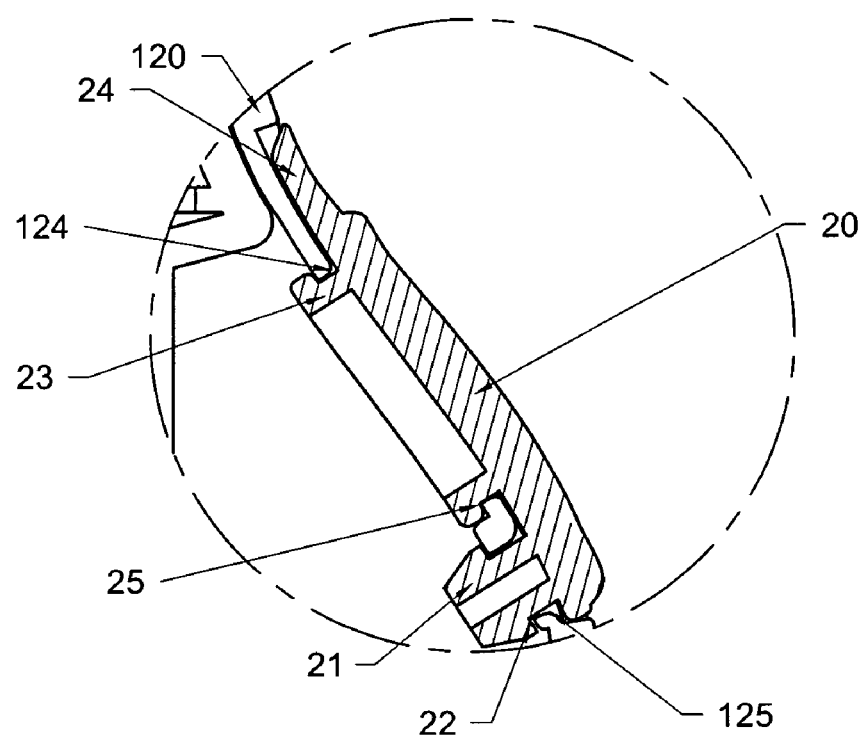
FIG. 8 is the detailed view of part II in FIG. 7.

As shown in FIG. 7 and FIG. 8, there is an axis hole 125 on the outer shell 120 next to inlet 124. On one end of the cover 20 there is a fitting axis 21 that will embed into axis hole 125 on the outer shell. There is a step extension 22 on end of the fitting axis 21 whose diameter is slightly larger than the axis hole. When the cover's fitting axis 21 is embedded into the axis hole 125, the step extension 22 on the fitting axis is larger and will prevent cover 20 from falling away from outer shell 120. At the other end of cover 20 there is a sealing outer rim 23 that covers inlet 124. Sealing rim 23 has the same shape as inlet 124 so that cover 20 can cover inlet 124 completely. At the outside of sealing rim 23 there can also be step extension 25 whose size is slightly larger than the inlet 124 so that after the sealing rim 23 is zipped into the inlet 124 it can clutch into the inlet and stay in the position. It is also possible to add an extension handle 24 on cover 20 to the side of the sealing rim 23. The extension handle 24 is on the outside of the outer shell 120. Pulling the extension handle 24 out of shell will pull the cover 20 and separate the sealing rim 23 which is embedded in the inlet 124 to move away from the inlet. Then the particles can be fed into the material chamber 1 from the inlet 124. At this time the fitting axis 21 will not fall apart from the axis hole 125. So when the inlet 124 is open, the cover 20 will not be broken away from outer shell 120. This is very convenient.

As shown in FIGS. 1, 2, 3, and 4, the handle set 200 includes mounted handle 210 and motion handle 220. The lower part of the mounted handle 210 and motion handle 220 are both inside the shell and the upper part of both stretch out of the shell. It is recommended that the mounted handle 210 and motion handle 220 be positioned in the central plane of the shell 100. The mounted handle 210 and motion handle 220 are positioned opposing each other. On the outer side of both handles there is a sliding resistant layer 201, i.e., the motion handle has a sliding resistant layer 201 on the side that is away from the mounted handle, and the mounted handle has a sliding resistant layer 201 on the side that is away from the motion handle. It is recommended that the sliding resistant layer 201 be made from rubber and has the same contour as the handles so that it will fit into the notches on the sides of handles 210 and 220 to make sure the contour of the handles is smooth yet sliding resistant. Thus the user will not slide when holding the handles. The lower part of the mounted handle is fixed into the fixing groove 211 inside the inner shell, thus it is not going to move away from the shell.

As shown in FIGS. 2, 3, 4, 7, and 10, there is a driving axis 3 at the lower end of motion handle 220. There can be an axis hole 222 at the lower end of motion handle 220 to allow the driving axis 3 to pass through this axis hole 222, so that the motion handle can spin along this driving axis inside the shell. Thus, because the spinning center (i.e. the driving axis 3) is placed inside the shell, the arm of the motion handle where the force is applied will be longer, reducing the actual force been applied.

Between motion handle 220 and inner shell 110 there is an elastic repositioning unit. This unit will push the motion handle away from the mounted handle. As shown in FIGS. 3 and 4, the elastic repositioning unit selected in this implementation is a twisted spring 40. One end of the twisted spring (not shown in the figure) is fixed to the lower end of the motion handle 220, the other end 42 of the twisted spring is fixed to the inner shell 110. It is recommended that that center ring 43 of the spring be placed on the driving axis 3 so that it is easier to place the twisted spring 40 inside the chamber.

When the handles are held and pulled towards each other, the upper part of motion handle 220 moves towards the mounted handle, pulling the lower end of the motion handle 220 to rotate along driving axis 3. The twisted spring 40 is then compressed. When the handle set is loosened and less force is applied, twisted spring 40 will move back, pushing the lower end of the motion handle to move back too. The upper part of the motion handle 220 will also move away from mounted handle 210. Thus by grabbing and loosing the handle set using one hand, the lower end of the motion handle 220 will move back and forth along the driving axis inside the shell.

As shown in FIGS. 3, 4, 5, and 10, the grinding set includes sector unit 310 and grinding unit 320. The sector unit includes a sector cylinder 311. On the sector cylinder 311 there are multiple parallel teeth 312. The sector unit has a spinning axis 313. This spinning axis 313 is at the rotation center of the sector cylinder 311 of the sector unit and is vertical to the plane of the motion handle 220 and mounted handle 210. Thus, the sector unit 310 can spin along the spinning axis 313 in the same plane as the motion handle 220 and mounted handle 210. This spinning axis 313 can be placed the same way as the driving axis that is at the lower end of the motion handle so that the sector unit 310 can spin inside the shell. It is recommended that that the teeth 312 on the sector cylinder 311 placed on a tooth unit 314, and then install the tooth unit 314 on the sector cylinder 311. This tooth unit 314 has the same curve as the sector cylinder 311. Its side with the teeth 312 faces the outside of the sector cylinder 311, i.e., away from the spinning center of the sector cylinder. Thus tooth unit 314 can be made from wear resistant substances, such as cast iron. The sector unit 310 can be made from cheap substances such as plastic. Thus the teeth 312 have a great grinding performance while it is not needed for the whole sector unit been made from wear resistant substances, reducing the cost. It is also possible to choose different substances of tooth unit 314 based on the material that is to be grinded. When grinding salt particles, tooth unit 314 made of ceramic can be used to avoid the erosion of the salt to the metal, while tooth unit 314 made of metal can be used when grinding pepper particles.

Figure 10:
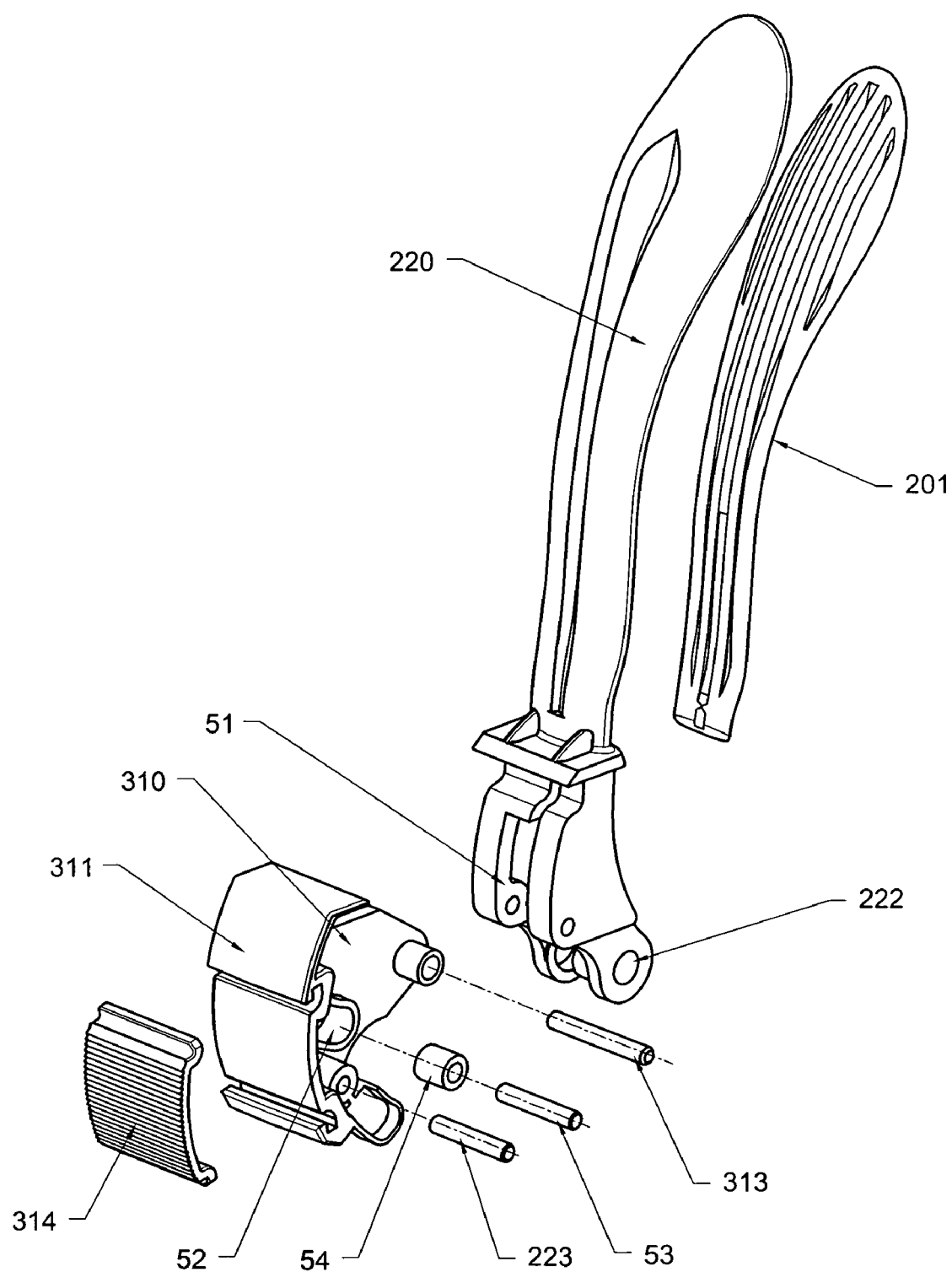
FIG. 10 is the dissembled view of the motion handle and sector unit of this single-handed vertical solid material grinder.

As shown in FIGS. 3, 4, and 10, there is also a driving set between the motion handle 220 and sector unit 310 so that the motion handle 220 can drive the sector unit 310 swing back and forth along its spinning axis when the motion handle 220 swings bank and forth along the driving axis inside the shell. The driving set can be the slot/shaft combination between the lower part of the motion handle and the sector unit 310. Specifically, a slot 51 can be placed at the lower end of motion handle 220. The sector unit 310 can be placed into this slot 51 so that the sector cylinder 311 and the spinning axis 313 of the sector unit 310 are placed on the two sides of the motion handle 220. In the sector unit 310, inside the handle slot 51 there is an arc slot 52. At the lower part of the motion handle, there is a shaft cap 54 that matches into the arc slot 52 of the sector unit. This shaft cap 54 goes through the arc slot 52 on the sector unit to connect the lower part of the motion handle 220 and the sector unit 310. This shaft cap 54 fits into the lower part of the motion handle 220 through the shaft 53 and can move inside the arc slot 52. When the motion handle 220 spin move the driving axis inside the shell, the shaft cap 54 that is fixed into the lower part of the motion handle 220 glides inside the arc slot 52 of the sector unit, thus make the sector unit 310 move against the motion handle 220. So the sector unit 310 will swing along the spinning axis 313 inside the shell. Thus, when the user drives the handle set using one hand to make the motion handle 200 moving back and forth inside the shell, the sector unit 310 is also forced to swing back and forth along the spinning axis 313 by the driving set.

As shown in FIGS. 3, 4, and 5, the grinding unit 320 is mounted inside the inner shell 110, between the material chamber 1 and the sector surface 311. There is at least one fixed teeth 321 on the grinding unit 320. Similarly, all the fixed teeth 311 can be placed onto a fixed tooth unit 322. The fixed tooth unit 322 will then be embedded onto the grinding unit to make sure to keep both the wear resistance and the low cost of the unit. Inside the inner shell there is a throat 106 on top of the grinding unit 320 connecting the material chamber 1 to the fixed teeth 321. The grinding unit 320 is close to the sector cylinder 311 and is to the lower outer side of the sector surface. Because the shape of the sector cylinder 311 on the center plane of the shell is a sector, when the sector surface 311 of the sector unit moves along the spinning axis 313, the sector surface 311 keeps on the arc of its rim. Thus the distance between the sector surface 311 and the fixed teeth 321 will not change. The distance between the fixed teeth 321 of the grinding unit and the parallel teeth 312 of the tooth unit should be adjusted appropriately. It is better to be smaller than the size of the feeding particles, and the fixed teeth 321 of the grinding unit should face the parallel teeth 312 but should not touch them. Therefore, when the particles fall from material chamber 1 to the fixed teeth 321 through the throat 106, they will not slide out through the aperture between the fixed teeth 321 of the grinding unit and the parallel teeth 312. And when the parallel teeth 312 move downward following the sector cylinder 311, fixed teeth 321 and the parallel teeth 312 will hold the particles between the teeth and smash them into powder. Thus the grinding effect is achieved.

Figure 15:
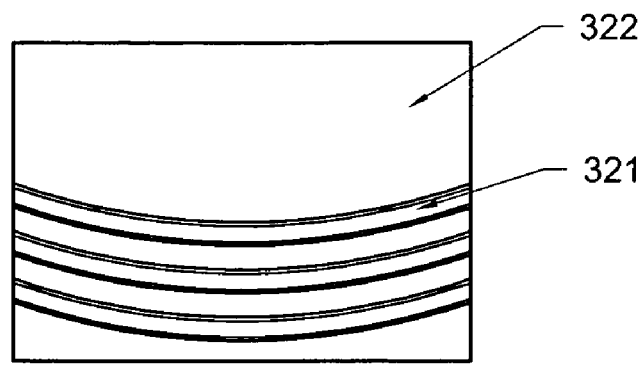
FIG. 15 is the tooth pattern of the grinding unit of the grinding set of this single-handed vertical solid material grinder.

It is recommended that the teeth 312 lean towards the grinding unit 320 so that it is easier to smash the particles. The shape of teeth 312 can be axial, i.e., column teeth, as shown in FIG. 6a. Or it can form an angle with the central axis of the gear, i.e., beveled teeth, as shown in FIG. 6b. It is recommended that the teeth is placed crossed beveled, as shown in FIG. 6c. This way the particles falling into the tooth aperture of teeth 312 will slide into the center of the tooth unit 314 through the tooth aperture. When grinding, teeth 312 will produce forces from two different sides on the particles so that it is more stable instead of moving around. The fixed teeth 321 can be rectangle in a sectional view. But it is recommended to be arc in sectional view, i.e., each tooth is an arc as shown in FIG. 15 so that when the teeth unit 314 moves, teeth 312 will push the particles to the center of the fixed teeth 321, improving the efficiency of grinding.

Figure 9:
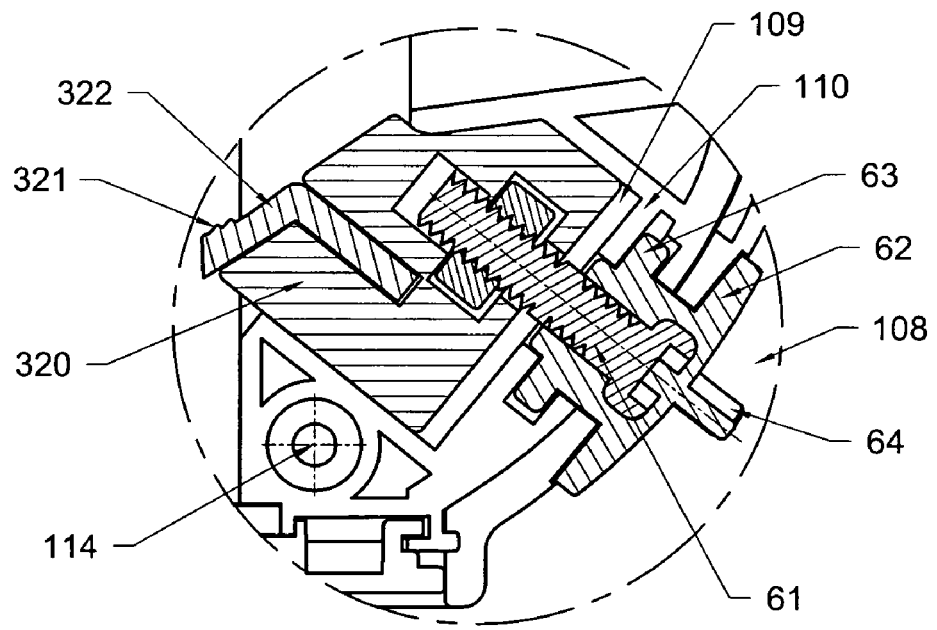
FIG. 9 is the detailed view of part III in FIG. 7.
Figure 16:
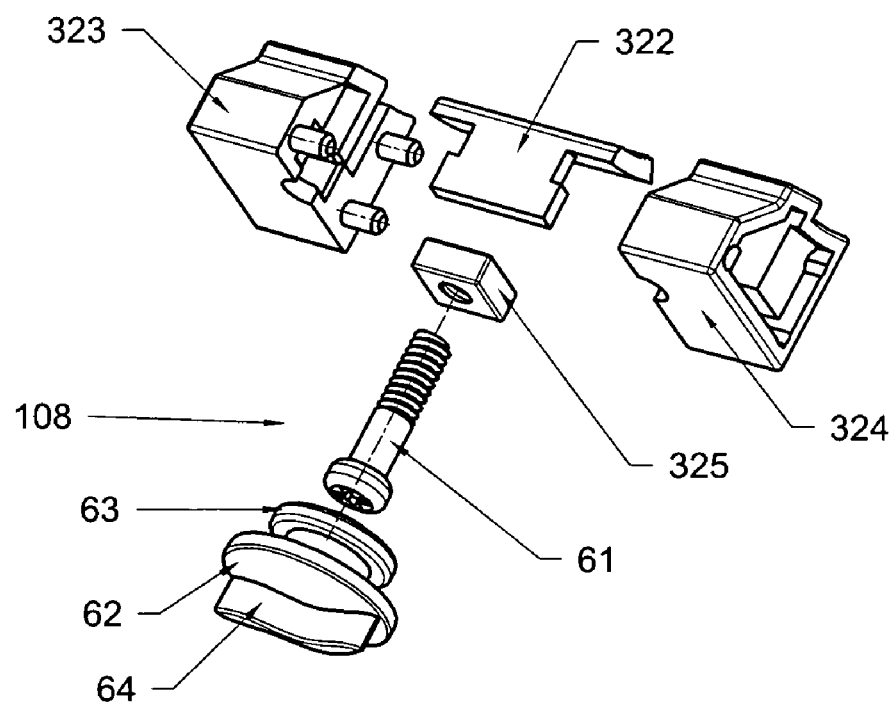
FIG. 16 is the structural view of the grinding unit of the grinding set of this single-handed vertical solid material grinder.

As shown in FIGS. 5, 7, and 9, the said grinding unit 320 is placed in a grinding unit slot 109 inside the inner shell 110. The slot 131 faces sector surface 311. There is also a position adjusting screw bolt 108 on the inner shell. The screw bolt 108 matches into the grinding unit 320. Its end is fixed into the inner shell 110 and stretches outside the outer shell 120. Specifically, the adjusting screw bolt can include bolt 61 and adjustment handle 62, fitting the end of the screw bolt 61 into the adjustment handle 62. There is a round nut 63 on the adjustment handle 62 that has the same axis as bolt 61. The nut 63 works together with inner shell 110 so that the adjustment handle 62 is fixed on the shell and can only move on the axial direction. There can be an outstretching handle 64 at the outside end of the adjustment handle 62, which can be a plane or any other shapes that is easy to adjust manually. When turning the adjustment handle 62, the adjustment handle 62 drives the bolt to move against the grinding unit so that its axial position versus the grinding unit changes. The distance between the grinding unit 320 and the end of adjustment bolt 108 changes, and the grinding unit 320 will slide in the grinding unit slot 109. Thus the distance between the grinding unit 320 and the sector surface 311 changes, too, adjusting the distance between the fixed teeth 321 and parallel teeth 312, and adjusting the size of the finished particles. As shown in FIG. 16, grinding unit 320 can be formed by left part 323 and right part 324. Inside the grinding unit 320 there is a screw nut 325. When the two parts 323 and 324 of the grinding unit 320 are put together, the end of the fixed tooth unit 322 will be fixed inside the grinding unit, and the fixed teeth 321 on the fixed tooth unit 322 will show up on the outside the grinding unit 320. Thus it is very easy to change to different types of fixed teeth to handle different materials. For example, fixed teeth using ceramic material can be used to grind salt, while fixed teeth using metal can be used to grind pepper. Screw bolt 61 can stretch into the inside of grinding unit 320 to match with the screw hole in the screw nut 325. Rotating the adjustment handle 62 will drive the bolt 61 to rotate, thus forcing the grinding unit 320 to move inside the grinding unit slot 109, and changing the distance between the fixed teeth 321 and the parallel teeth 312.

Inside the shell 100, under the aperture between the fixed teeth 321 and the parallel teeth 312 there is an outlet 102. Thus the particles grinded by the fixed teeth 321 and the parallel teeth 312 can be discharged out of shell from the outlet 102. As shown in FIGS. 3, 4, and 5, a particle removing column 103 can be set up inside the shell. This particle removing column 103 is under the sector cylinder. On its side facing the sector surface there is a particle removing surface 104. This particle removing surface 104 matches the sector surface 311 so that the particle removing surface 104 is closely adjacent to the outside of the sector surface 311 and has the same axis as the sector surface 311. Thus particle removing surface 104 is parallel to the sector surface 311 and the distance between particle removing surface 104 and the sector surface 311 is small enough, may even be directly contacted with each other. Thus the particles attaching to sector surface 311 or stuck in the parallel teeth 312 will be removed and fall directly into the outlet 102, thus preventing the particles sticking to the sector surface 311 from accumulating in the space under the sector unit and clogging the sector unit and stopping it from moving. There can be multiple particle removing columns. Between these particle removing columns 103 there can be aperture 105 that leads to the outlet 102. Thus the particles removed from the particle removing column 103 will fall into outlet 102 through the aperture 105, preventing them from accumulating in the shell 110 and clogging the sector cylinder 311.

As shown in FIGS. 2, 7, 11, 12, 13, and 14, there is a slot 130 at the outlet 102 in the shell. The slot 130 has a slot cover 140 that can cover outlet 102. Slot cover 140 can glide in the slot 130 to open or close outlet 102. The slot cover 140 can be L shape, including the vertical cover 142 and horizontal cover 141. Slot 130 can also be L shape, including a horizontal slot 131 at the outlet 102 at the bottom of the shell and the vertical slot 132 on the inner surface of the inner shell. The horizontal cover 141 can glide in the horizontal slot 131 and cover the outlet 102 that is at the bottom of the shell. The vertical cover 142 can glide in the vertical slot 132 along the inner shell surface. There is a vertical slot 143 on the vertical cover 142 of the slot cover (see FIG. 13). There is also a driving shaft 223 at the side of the sector unit 310 (see FIG. 10). This shaft 223 cooperates with the vertical slot 143 so that it can slide inside the vertical slot 143. When the upper part of the motion handle 220 moves back and forth, the shaft 223 on the side of the sector unit 310 will also move back and forth along the spinning axis. The movement of the this shaft 223 can be decoupled into the vertical movement along the vertical slot 143 and the horizontal movement that is at the right angle to the vertical slot 143. Thus the horizontal movement of shaft 223 will drive the vertical cover 142 of the slot cover to slide back and forth in the vertical slot 132. The horizontal cover 141 that is in the horizontal slot 131 will then open or cover outlet 102. It is recommended that the outlet 102 to be positioned on the end of the slot 130 that is close to the mounted handle 210. Thus when the motion handle 220 moves towards the mounted handle 210, the horizontal movement of shaft 223 is moving away from the mounted handle 210. The slot cover 140 will open up outlet 102 and make the finished particles discharging through the outlet 102 from the inner shell 110. When the motion handle 220 is back to the original position by the force of twisted spring 40, the slot cover 140 will cover the outlet 102. Thus when the machine is not grinding, the outside dirt will not get into the inside of the side, avoiding contamination.

In this implementation example, the slot 130 consists of the slot 133 on the inner shell and the slot disc 150. To be specific, the slot disc 150 has a vertical disc 151 and a horizontal disc 152. Slot 133 was set on the corresponding positions of the inner shell's inner surface and bottom. The vertical disc 151 of the slot disc 150 is embedded in the slot 133. There are matching positioning holes 225 and positioning columns 226 between the slot 133 and the inner surface of the inner shell (see FIG. 12) to help positioning the slot. There is a depressed hole 153 in the slot 133. The vertical disc 151 of the slot disc covers the depressed hole to form a vertical slot 132 of the slot, so that the vertical cover 142 of the slot cover can slide in it. The horizontal disc 152 of the slot disc and the bottom of the inner shell forms the horizontal slot 131 of the slot, so that the horizontal cover 141 of the slot cover can slide in it.

There is a sector sliding slot 135 on the slot disc 150 that has the same center of sector cylinder 311. When the shaft 223 moves back and forth, it can slide in this sector sliding slot 135. Shaft 223 goes through this sector sliding slot 135 to match with the vertical slot 143 of the slot cover on the inner surface of the shell, thus driving the cover 140 moving.

Since shaft 223 drives vertical cover 142, while the horizontal cover 141 is in the slot 130, when shaft 223 is moving the horizontal cover 141, its force is applied through the distance between the shaft 223 and the horizontal slot 131. The slot cover 141 is prone to get stuck in the horizontal slot 131. It is recommended that a horizontal slot 136 is added to the depressed hole 153 of the slot 133 that is parallel to the horizontal slot 131. Correspondently, a horizontal bulge 144 can be introduced on the side facing the inner surface of the inner shell of the vertical cover 142 of the slot cover to match the horizontal sliding slot 146. Thus the horizontal bulge can slide inside horizontal slot 131. Thus both vertical slot 143 and horizontal bulge 144 are on the vertical cover 142. The force of the shaft 223 then is applied between the shaft 223 and the horizontal slot 136, preventing the slot cover be stuck in the slot 130. In this implementation example, the shaft is the shaft 53 that is on the lower end of the motion handle and is used to fix shaft cap 54, i.e., the cap 54 at the lower end of the motion handle stretches out to the vertical slot 143 of the slot cover.

As shown in FIG. 2, a collection box 5 can be placed at the bottom of the outer shell 120. This collection box 5 is placed under the outlet 102 and matches into the bottom of the outer shell 120. So the collection box 5 can be installed at the bottom of the outer shell using screw or buckle. The finished particles discharged from the outlet 102 can be collected in the collection box 5. When enough particles are processed, the user can stop operating the handle set and take the collection box out of the outer shell and use the finished product.

Figure 17:
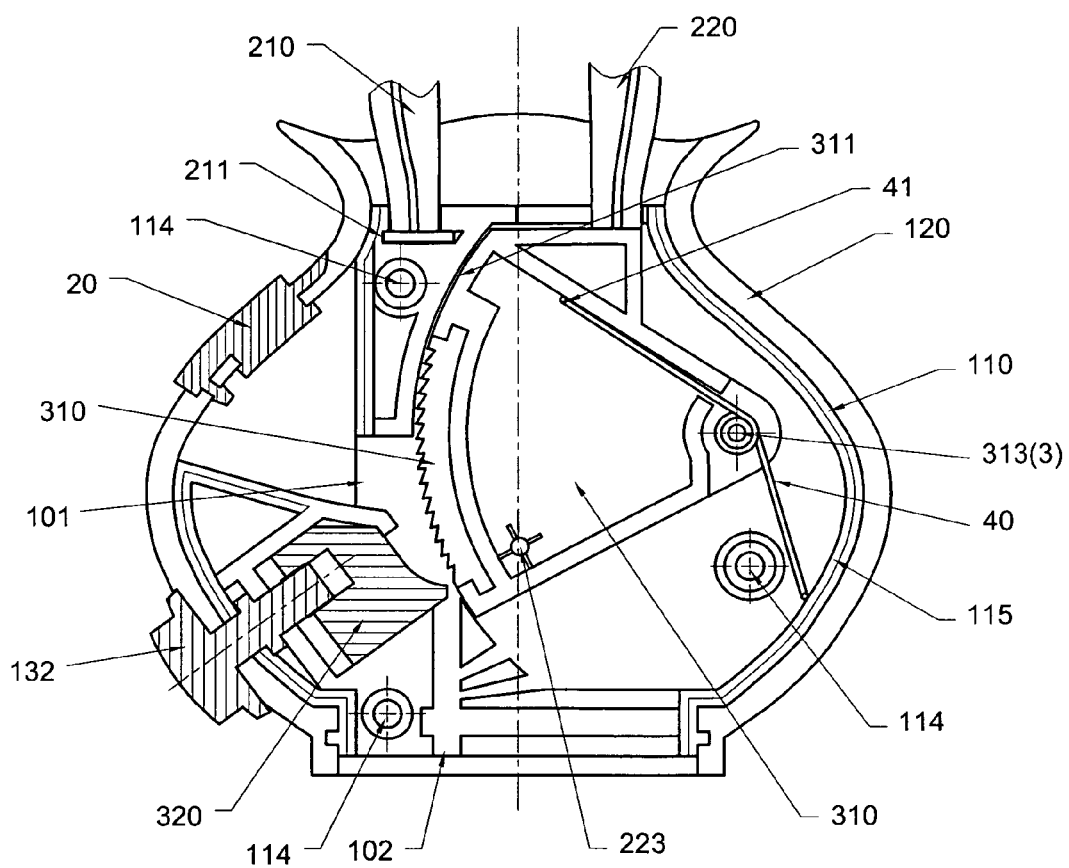
FIG. 17 is another implementation of this single-handed vertical solid material grinder.

As shown in FIG. 17, there is another implementation example of the single-handed vertical solid material grinder of this utility patent application. The difference between this one and the one that illustrated above is the driving mechanism of the motion handle and the sector unit. To be specific, the spinning axis 313 of the sector unit is the same as the driving axis 3 of the motion handle, and is at the rotation center of the sector cylinder 311. By mounting the sector unit 310 under the motion handle 220 through the driving set, the sector unit 310 is not moving relative to the motion handle 220. The sector unit 310 and the motion handle 220 is a whole piece. Therefore, when the motion handle 220 move towards or away from the mounted handle in the plane of the handle set, the sector cylinder 311 of the sector unit will move along its axis (the spinning axis 313 and driving axis 3) back and forth. The teeth on the sector cylinder will sweep over the fixed teeth on the grinding unit 320. The particles will also get grinded this way to achieve the grinding result. Besides, the shaft that stretches into the vertical slot of the slot cover can also be set at the side of the sector unit.

The above mentioned examples simply list several possible implementations of this utility patent application. The description here is very detailed and specific. However, it does not mean that this is the limitation of the utility patent application. Instead, most normal technical people in this field can improve the design based on the basic idea of this patent, such as changing the inlet shape to diamond shape. These changes are all under the protection of this utility patent application.

The invention claimed is:

1. A single-handled vertical solid material grinder comprising, a shell that has a material inlet and an outlet, which has a material chamber that contains the solid material particles and is connected to the inlet, a handle set with a motion handle and a mounted handle, the upper part of the motion handle and the mounted handle stretches outside the shell, the lower part of the mounted handle is mounted inside the shell, the lower part of the motion handle has a driving axis that is mounted inside the shell, the said motion handle can move back and forth around the said driving axis, between the said motion handle and the shell there is a elastic repositioning unit that pushes the motion handle away from the mounted handle;

a grinding set that includes a sector unit with a sector surface inside the shell and a grinding unit that is placed outside the sector surface, wherein there are multiple parallel teeth on the said sector surface, wherein there is a spinning axis mounted inside the shell at a sector unit's spinning center, and is vertical to the plane of the motion handle and the mounted handle, wherein there is at least on fixed teeth on the said grinding unit that matches the said parallel teeth, the motion handle and the sector unit is a driving set that will driving the sector unit move back and forth around the spinning axis; wherein there is an aperture leading from the material chamber to the fixed teeth of the grinding unit above the grinding unit in the said shell, wherein there is an outlet beneath the fixed teeth on the grinding unit in the shell, wherein said sector unit's spinning axis and the motion handle's driving axis overlap each other, and wherein said sector unit fits into the motion handle via the driving set.

2. The single-handled vertical solid material grinder of claim 1, the said driving set includes shaft and slot set between the said sector unit and the lower part of the motion handle.

3. The single-handled vertical solid material grinder of claim 1, wherein there is a horizontal slot at the outlet in the shell, the slot has a slotting cover that can cover the outlet, said slotting cover has a vertical trail, wherein there is a driving shaft in the said sector unit that matches the said vertical trail, said driving shaft drives the said slotting cover to move back and forth in the slot.

4. The single-handled vertical solid material grinder of claim 3, wherein there is a notch on the inner surface of the shell, wherein there is a notch cover on the notch, between the notch cover and the notch is a slot, wherein there is a sector slot in the said notch cover that has the same rotation axis as the sector unit, said driving shaft passes through the said sector slot and matches into the vertical slot of the slotting cover.

5. The single-handled vertical solid material grinder of claim 3, wherein there is a particle removing column inside the shell under the said sector unit, the particle removing column has a particle removing surface that faces the sector surface and has the same center as the sector surface, said particle removing surface is right outside the sector surface.

6. The single-handled vertical solid material grinder of claim 1, said elastic repositioning unit is a spring between the sector surface and the shell.

7. The single-handled vertical solid material grinder of claim 1 wherein said grinding unit is placed in the grinding unit chamber inside the shell and facing the sector surface and wherein there is a distance adjustment screw on the grinding unit in the shell to adjust the distance between the fixed teeth and the parallel teeth.

8. The single-handled vertical solid material grinder of claim 1, wherein said shell has an outer shell and an inner shell, said material chamber is between the outer shell and the inner shell, both the said inlet and outlet are on the said outer shell, said aperture connecting the material chamber and the grinding unit is in the inner shell, and wherein said handle set and the grinding set are inside the inner shell.

9. The single-handled vertical solid material grinder of claim 8 wherein there is a sealing cover on the inlet, said sealing cover has amounting axis on one end, which is mounted to the outer shell, and wherein to the other end is a stretching rim that covers the inlet.

10. The single-handled vertical solid material grinder of claim 1, wherein there is a teeth unit on the sector surface of the sector unit, said parallel teeth are all located on the outside of the teeth unit.

11. The single-handled vertical solid material grinder of claim 1, wherein there is a collection box under the outlet on the outer shell to collect the particles generated.

12. The single-handled vertical solid material grinder of claim 1, wherein there is sliding proof cover on the motion handle of the handle set.

* * * * *